United States Patent
Toh et al.

(10) Patent No.: US 12,437,879 B2
(45) Date of Patent: Oct. 7, 2025

(54) SYSTEM AND METHOD FOR DETERMINING AN APPROPRIATE MOMENT FOR MODIFYING OR CHANGING AN INITIAL MYOPIA CONTROL SOLUTION

(71) Applicant: Essilor International, Charenton-le-Pont (FR)

(72) Inventors: Yin Zhen Janice Toh, Singapore (SG); Damien Paille, Singapore (SG); Gilles Garcin, Charenton-le-Pont (FR)

(73) Assignee: Essilor International, Charenton-le-Pont (FR)

(*) Notice: Subject to any disclaimer, the term of this patent is extended or adjusted under 35 U.S.C. 154(b) by 191 days.

(21) Appl. No.: 18/253,949

(22) PCT Filed: Dec. 15, 2021

(86) PCT No.: PCT/EP2021/086033
§ 371 (c)(1),
(2) Date: May 23, 2023

(87) PCT Pub. No.: WO2022/129253
PCT Pub. Date: Jun. 23, 2022

(65) Prior Publication Data
US 2023/0411021 A1 Dec. 21, 2023

(30) Foreign Application Priority Data
Dec. 18, 2020 (EP) .................................... 20306613

(51) Int. Cl.
*G16H 50/70* (2018.01)
(52) U.S. Cl.
CPC .................................. *G16H 50/70* (2018.01)

(58) Field of Classification Search
CPC ........ G16H 50/70; G16H 20/10; G16H 20/30; G16H 20/40; G16H 40/63; G02C 2202/24; G02C 7/024
See application file for complete search history.

(56) References Cited

U.S. PATENT DOCUMENTS

| 2010/0296058 A1* | 11/2010 | Ho | .................... | G02C 7/04 |
| | | | | 351/159.52 |
| 2011/0313058 A1 | 12/2011 | Neitz et al. | | |

(Continued)

FOREIGN PATENT DOCUMENTS

| AU | 2018 202 725 A1 | 11/2018 |
| CN | 110264108 A | 9/2019 |

(Continued)

OTHER PUBLICATIONS

Gomel N, Negari S, Frucht-Pery J, Wajnsztajn D, Strassman E, Solomon A. Predictive factors for efficacy and safety in refractive surgery for myopia. PLoS One. Dec. 14, 2018;13(12):e0208608. doi: 10.1371/journal.pone.0208608. PMID: 30550575; PMCID: PMC6294382. (Year: 2018).*

(Continued)

*Primary Examiner* — Sun M Li
(74) *Attorney, Agent, or Firm* — Oblon, McClelland, Maier & Neustadt, L.L.P.

(57) ABSTRACT

A system for determining an appropriate moment for modifying or changing an initial myopia control solution used by a myopic subject at an initial time having a database of available myopia control solutions and data relative to the evolution of the efficacy of each myopia control solution with criterion including determining the value of said criterion at an ulterior time, determining, based on this value, the efficacy of this initial myopia control solution and the efficacy of other myopia control solutions of said database at this ulterior time, comparing the efficacy of said initial (Continued)

myopia control solution and the efficacy of other myopia control solutions of said database determined for said ulterior time, and when the efficacy of said initial myopia control solution is lower than the efficacy of at least one of said other myopia control solutions at said ulterior time, determining appropriate moment depending on said ulterior time.

20 Claims, 2 Drawing Sheets

(56) References Cited

U.S. PATENT DOCUMENTS

| | | | |
|---|---|---|---|
| 2014/0285429 A1* | 9/2014 | Simmons | G02B 27/0179 359/259 |
| 2017/0023798 A1* | 1/2017 | Yu | G02C 7/02 |
| 2017/0209036 A1* | 7/2017 | Brennan | G02C 7/027 |
| 2019/0227636 A1* | 7/2019 | Lopez Gil | G06F 3/013 |
| 2019/0246896 A1* | 8/2019 | Hernandez-Castaneda | A61B 3/028 |
| 2019/0294861 A1* | 9/2019 | Quinteros | G16H 50/20 |
| 2021/0375460 A1* | 12/2021 | Li | A61B 3/00 |

FOREIGN PATENT DOCUMENTS

| | | | |
|---|---|---|---|
| EP | 3 199 097 A2 | 8/2017 | |
| WO | WO-2009096643 A1 * | 8/2009 | G06F 3/01 |
| WO | WO 2014/131791 A1 | 9/2014 | |
| WO | 2019/166654 A1 | 9/2019 | |
| WO | WO 2020/120595 A1 | 6/2020 | |
| WO | WO 2020/126514 A1 | 6/2020 | |

OTHER PUBLICATIONS

Prousali E, Haidich AB, Fontalis A, Ziakas N, Brazitikos P, Mataftsi A. Efficacy and safety of interventions to control myopia progression in children: an overview of systematic reviews and meta-analyses. May 9, 2019;19(1):106. doi: 10.1186/s12886-019-1112-3. PMID: 31072389; PMCID: PMC6506938 (Year: 2019).*

Kinoshita N, Konno Y, Hamada N, Kanda Y, Shimmura-Tomita M, Kaburaki T, Kakehashi A. Efficacy of combined orthokeratology and 0.01% atropine solution for slowing axial elongation in children with myopia: a 2-year randomised trial. Sci Rep. Jul. 29, 2020;10(1):12750. doi: 10.1038/s41598-020-69710-8. (Year: 2020).*

Berton B, Chennell P, Yessaad M, Bouattour Y, Jouannet M, Wasiak M, Sautou V. Stability of Ophthalmic Atropine Solutions for Child Myopia Control. Pharmaceutics. Aug. 17, 2020; 12(8):781. doi: 10.3390/pharmaceutics 12080781. PMID: 32824572; PMCID: PMC7465901. (Year: 2020).*

International Search Report issued on Feb. 17, 2022 in PCT/EP2021/086033 filed on Dec. 15, 2021, 4 pages.

Wildsoet et al., "IMI—Interventions for Controlling Myopia Onset and Progression Report", IOVS, Special Issue, vol. 60, No. 3, 2019, 26 pages.

Gifford et al., "IMI—Clinical Management Guidelines Report", IOVS, Special Issue, vol. 60, No. 3, 2019, 20 pages.

Phillips et al., "Myopia progression: can we control it?", Optometry in Practice, vol. 14, Issue 1, 2013, pp. 33-44.

Chiang et al., "Treatment of Childhood Myopia with Atropine Eyedrops and Bifocals Spectacles", Binocular Vision & Strabismus Quarterly, vol. 18, No. 3, 2001, 7 pages.

Syniuta et al., "Atropine and Bifocals Can Slow the Progression of Myopia in Children", Binocular Vision & Strabismus Quarterly, vol. 16, No. 3, 2001, 6 pages.

Shih et al., "An intervention trial on efficacy atropine and multifocal glasses in controlling myopic progression", Acta Ophthalmol. Scandinavica, vol. 79, 2001, pp. 233-236.

Hanne, "Myopia progression in young school children: A prospective study of myopia progression and the effect of a trial with bifocal lenses and beta blocker eye drops", Book 1999, 3 pages.

Wan et al., "The Synergistic Effects of Orthokeratology and Atropine in Slowing the Progression of Myopia", Journal of Clinical Medicine, vol. 7, No. 259, 2018, 9 pages.

Kinoshita et al., "Additive effects of orthokeratology and atropine 0.01% ophthalmic solution in slowing axial elongation in children with myopia: first year results", Japanese Journal of Ophthalmology, vol. 62, 2018, pp. 544-553.

Tong et al., "Atropine for the Treatment of Childhood Myopia: Effect on Myopia Progression after Cessation of Atropine", Ophthalmology, 116 (3), 2009, pp. 572-279.

Brennan et al., "Evidence-Based Efficacy of Myopia Control Interventions", Johnson & Johnson Vision, 2018, 1 page.

* cited by examiner

SYSTEM AND METHOD FOR DETERMINING AN APPROPRIATE MOMENT FOR MODIFYING OR CHANGING AN INITIAL MYOPIA CONTROL SOLUTION

TECHNICAL FIELD OF THE INVENTION

The invention relates to a system and a method for determining an appropriate moment for modifying or changing an initial myopia control solution used by a myopic subject.

BACKGROUND INFORMATION AND PRIOR ART

Numerous documents describe devices and methods for controlling myopia evolution in a subject, in particular in children.

Myopia control solutions designate the devices or products and associated methods used to slow down the progression of myopia in a subject.

Myopia occurs when the eyeball is too long, relative to the focusing power of the cornea and lens of the eye. This causes light rays to focus at a point in front of the retina, rather than directly on its surface.

As a result, distant objects are seen blurred by a myopic subject.

Different types of devices and products are known for slowing down myopia progression, such as ophthalmic lenses, contact lenses or drugs.

Moreover, different use of these devices and products are known for slowing down myopia progression. Different myopia control solutions associating one or more devices and/or products and their specific use are therefore known and implemented by eye care professionals to try to limit the progression of myopia in given subjects.

Each subject may react differently to the different myopia control solutions. The different myopia control solutions known may therefore have different efficacy for different subjects. Moreover, the efficacy of each myopia control solution may vary with time and other conditions of implementation.

Monitoring the efficacy of the myopia control solution implemented for a subject is therefore necessary to ensure that an efficient myopia control solution is proposed to the subject at all times.

SUMMARY OF THE INVENTION

In this context, one object of the invention is to provide a system for determining an appropriate moment for modifying or changing an initial myopia control solution used by a myopic subject.

This is achieved according to the invention by providing a system for determining an appropriate moment for modifying or changing an initial myopia control solution used by a myopic subject at an initial time, comprising one or more memories and one or more processors, said one or more memories comprising a database of available myopia control solutions and data relative to the evolution of the efficacy of each myopia control solution with at least one criterion, said one or more processors being programmed to:

determine the value of said criterion at an ulterior time, determine, based on this value of said criterion at an ulterior time, the efficacy of this initial myopia control solution and the efficacy of other myopia control solutions of said database at this ulterior time, compare the efficacy of said initial myopia control solution and the efficacy of other myopia control solutions of said database determined for said ulterior time, and when the efficacy of said initial myopia control solution is lower than the efficacy of at least one of said other myopia control solutions at said ulterior time, determining said appropriate moment for modifying or changing said initial myopia control solution depending on said ulterior time.

In a general manner, the system according to the invention enables to improve the global strategy for limiting the progression of myopia in a subject either by modifying, at the appropriate moment, the initial myopia control solution without changing it for a different solution or by changing this initial myopia control solution for a different myopia control solution at the appropriate moment, therefore implementing two different myopia control solutions sequentially.

The initial myopia control solution applied to the subject being predetermined, the system determines an appropriate moment for modifying or changing this initial myopia control solution in order to ensure that a myopia control solution with optimal efficacy is applied to the subject at all times.

In the following, the wording «modifying the initial myopia control solution» will be used in the case where the initial myopia control solution is modified, for example by modifying an implementation parameter of this initial myopia control solution such as sphere value of a lens, dosage of a drug, duration of wear of a device . . . , and the wording «changing the initial myopia control solution» will be used when the initial myopia control solution is replaced by a different myopia control solution. Therefore, when the wording "modifying or changing the initial solution" is used, it is meant that the myopia control solution implemented after the appropriate moment determined may either be the initial myopia control solution with an implementation parameter modified or another myopia control solution.

Many different basic myopia control solutions are known and will be described in the following description. The myopia control solutions considered in the following may comprise one basic myopia control solution or several basic myopia control solutions combined, that is to say, implemented simultaneously. This is described in more details hereafter.

When the initial myopia control solution is only modified, the myopia control solution before and after the appropriate moment remains of the same type, that is to say, it may be the same single basic myopia control solution, as described hereafter, or the same combination of two or more basic myopia control solutions. For example, the use of drugs such as atropine, is a basic myopia control solution that may be combined, that is to say used simultaneously, with other basic myopia control solutions, such as correcting accommodative lag, providing retinal stimulation, peripheral hyperopic defocus or providing myopic defocus or corneal reshaping.

When the initial myopia control solution is modified, at least one implementation parameter of one of the basic myopia control solutions of said initial myopia control solution is modified. For example, the concentration or dosage of atropine is modified and/or the defocus provided is modified.

In a general manner, the implementation parameters of the myopia control solutions described here may comprise:

concentration, dosage, frequency of instillation in the eye of a drug, value of an optical feature of an ophthalmic lens such as sphere, addition, cut-off level of wavelength filter, distribution of power in the periphery, location and/or power of micro-lenses, dimension of scattering components, duration of wear of the ophthalmic lens, curvature profile, duration of wear of a lens for corneal reshaping.

When the initial myopia control solution is changed, the type of the myopia control solution after the appropriate moment is different from the type of the initial myopia control solution. The change may include adding one or several basic myopia control solutions to the initial myopia control solution already in use or removing one or several basic myopia control solutions from the initial myopia control solution already in use, to obtain a different myopia control solution. The change may also include replacing at least one of the basic myopia control solutions implemented in said initial myopia control solution by at least one other basic myopia control solution. Recent studies indeed suggest that, while many different initial myopia control solutions will have an effect reducing myopia progression for a subject, their efficacy tends to decrease with time or may provide a "rebound" effect after a first period of myopia progression reduction. During such a «rebound» effect, the increase of the myopia is accelerated compared to its progression without myopia control solution. Modifying or changing the initial myopia control solution implemented is a way of ensuring that the subject is provided with a myopia control solution having a satisfactory efficacy at all times.

The appropriate moment determined by the system according to the invention may be in particular the ulterior time itself or a moment determined depending on the ulterior time considered.

In an embodiment described in the following, comparing the efficacy of said initial myopia control solution and the efficacy of other myopia control solutions of said database determined for said ulterior time is performed by comparing graphical representations of the evolution of the efficacies of each myopia control solution considered with time. In this case, the appropriate moment may be determined based on the time where said graphical representations cross.

In another embodiment, comparing the efficacy of said initial myopia control solution and the efficacy of other myopia control solutions of said database determined for said ulterior time comprises comparing these efficacies at a plurality of ulterior times and determining said appropriate moment for modifying or changing said initial myopia control solution as the time where the efficacy of said initial myopia control solution becomes equal to the efficacy of another myopia control solution.

Other advantageous and non-limiting features of the system according to the invention may be the following:

said criterion comprises at least one of the following: time spent using the initial myopia control solution and activity of the subject;

said efficacy is estimated based on a predetermined relationship between the efficacy and said criterion;

said myopia control solution comprises one or more devices for implementing one of the following actions or several of the following actions simultaneously:

correcting an accommodative lag during near vision activities for example using a lens having a positive sphere power or providing myopic defocus, reducing the accommodative lag, correcting peripheral hyperopic defocus for example by using a lens having a positive sphere power in the region corresponding to peripheral vision, providing retinal stimulation for example using multiple light stimuli located in front of retina of the eye of the subject, providing a different contrast in peripheral vision of the subject for example by using a lens having a lower transmission in the region corresponding to peripheral vision, limiting the amount of red light entering the eye to reduce chromatism of the eye for example using a specific filter, providing light having a specific wavelength to the eye to inhibit eye lengthening, providing dynamically varying light stimuli such as flickering, providing drugs to regulate retinal and scleral muscarinic receptors, reshaping the cornea of the eye to reduce refraction defects, providing myopic defocus in the retinal periphery and/or optical aberrations by flattening the shape of the cornea;

said system comprises one or more devices for monitoring the subject and/or the environment of the subject and/or the activities of the subject and/or one or more inputting devices for inputting data relative to the subject and/or his environment and/or his activities;

said criterion comprises at least an activity of the subject and said system comprises one or more devices for monitoring the activity of the subject among the following: a clock, a timer, a viewing distance sensor, a lighting conditions sensor, a movement sensor, a digital planning of the activities of the subject, a questionnaire filled out by the subject;

said one or more memories comprise a database where at least one individual feature of the subject is recorded and wherein said data relative to the evolution of the efficacy of each myopia control solution with at least one criterion is determined taking into account said individual feature of the subject;

said individual feature of the subject is updated at predetermined moments, said data relative to the evolution of the efficacy of each myopia control solution with at least one criterion is updated taking into account said updated individual features of the subject and said appropriate moment for modifying or changing said initial myopia control solution is determined based on said updated data;

said one or more memories comprise a database where at least one individual feature of the subject is recorded and said one or more processors are programmed to preselect, among said database of available myopia control solutions a group of myopia control solution adapted to said subject based on said individual features, the efficacy of which is determined and compared to the efficacy of the initial myopia control solution;

said one or more memories comprise a database where at least one individual feature of the subject is recorded and said one or more processors are programmed to determine said initial myopia control solution, said determination comprising:

determining an efficacy of said myopia control solution for each myopia control solution of a group of myopia control solution recorded in said one or more memories based on said individual feature of the subject and using a predetermined relationship model configured for providing the efficacy of myopia control solutions in controlling myopia of a subject taking into account the individual feature of the subject;

said one or more memories comprise a database where at least one individual feature of the subject is recorded and said one or more processors are programmed to determine said initial myopia control solution, said determination comprising:

using a predetermined relationship model configured for providing the efficacy of each myopia control solution taking into account the individual feature of the subject, comparing the efficacies determined and determining said initial myopia control solution based on this comparison;

said individual feature of the subject comprises one or more of the following:

personal historical or physical features of the subject, optometric features of the subject, biometric features of the subject, general health features of the subject, features relative to a visual behavior of the subject, postural features of the subject;

said criterion comprises at least an activity of the subject, and said one or more processors are programmed to determine a modification of the current myopia control solution or a change for another myopia control solution taking into account the features of the activity of the subject regarding visual tasks, environment, safety and protection of the eyes of the subject;

said one or more processors are additionally programmed to determine a modified initial myopia control solution or a changed myopia control solution for said subject;

it comprises a device for emitting a signal indicating to the subject the appropriate moment for modifying or changing an initial myopia control solution as determined.

In a general manner, the system according to the invention is programmed to implement a method according to the invention, for determining an appropriate moment for modifying or changing an initial myopia control solution used by a myopic subject at an initial time, comprising the following steps:

providing a database of available myopia control solutions and data relative to the evolution of the efficacy of each myopia control solution with at least one criterion, determining the value of said criterion at an ulterior time, determining, based on this value of said criterion at an ulterior time, the efficacy of this initial myopia control solution and the efficacy of other myopia control solutions of said database at this ulterior time, comparing the efficacy of said initial myopia control solution and the efficacy of other myopia control solutions of said database determined for said ulterior time, and when the efficacy of said initial myopia control solution is lower than the efficacy of an alternative solution at said ulterior time, determining said appropriate moment for modifying or changing said initial myopia control solution depending on said ulterior time.

DETAILED DESCRIPTION OF EXAMPLE(S)

The following description with reference to the accompanying drawings will make it clear what the invention consists of and how it can be achieved. The invention is not limited to the embodiments illustrated in the drawings. Accordingly, it should be understood that where features mentioned in the claims are followed by reference signs, such signs are included solely for the purpose of enhancing the intelligibility of the claims and are in no way limiting on the scope of the claims.

Figure 1:
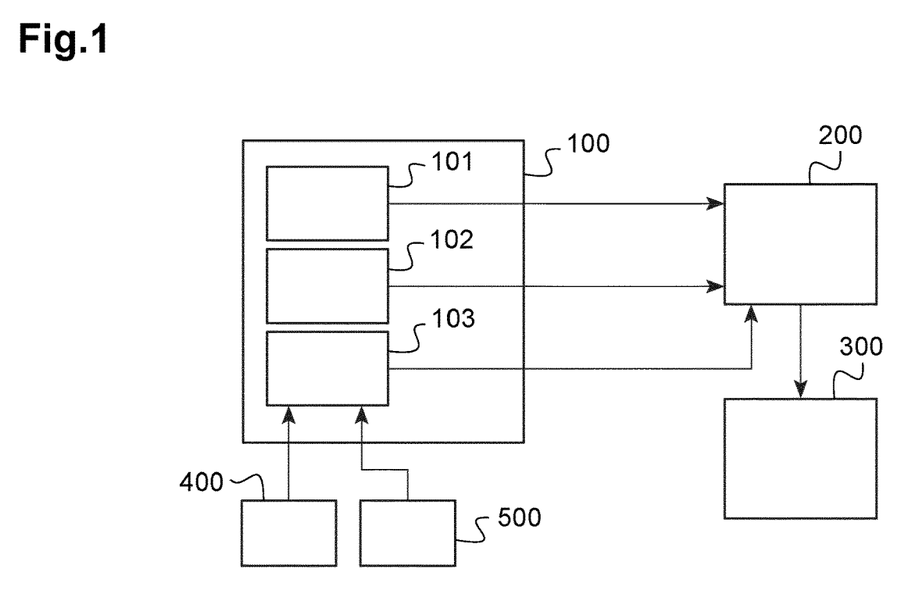
FIG. 1 is a schematic representation of the system according to the invention.

In the accompanying drawings:

FIG. 1 shows a schematic representation of the system according to the invention. This system for determining an appropriate moment for modifying or changing an initial myopia control solution used by a myopic subject at an initial time comprises one or more memories 100 and one or more processors 200.

As described hereafter, the system according to the invention allows implementing a method according to the invention for determining an appropriate moment for modifying or changing an initial myopia control solution used by a myopic subject at an initial time, comprising the following steps:

providing a database of available myopia control solutions and data relative to the evolution of the efficacy of each myopia control solution with at least one criterion, determining the value of said criterion at an ulterior time, determining, based on this value of said criterion at an ulterior time, the efficacy of this initial myopia control solution and the efficacy of other myopia control solutions of said database at this ulterior time, comparing the efficacy of said initial myopia control solution and the efficacy of other myopia control solutions of said database determined for said ulterior time, and when the efficacy of said initial myopia control solution is lower than the efficacy of an alternative solution at said ulterior time, determining said appropriate moment for modifying or changing said initial myopia control solution depending on said ulterior time.

Therefore the system and method according to the invention relates to determining the appropriate moment for modifying an initial myopia control solution. This initial myopia control solution is predetermined by any device or method known from the man skilled in the art. Such a device/method for determining an initial myopia control solution is for example described in document WO2020/120595.

Said one or more memories 100 comprise a database 101 of available myopia control solutions and data 102 relative to the evolution of the efficacy of each myopia control solution with at least one criterion.

Said data 102 relative to the evolution of the efficacy of each myopia control solution with at least one criterion may be comprised in the same database 101 than the one comprising the available myopia control solutions or in a different database.

Any known available myopia control solution may be taken into account in the system according to the invention.

Up to date, many different myopia control solutions have been described and tested and are currently used to limit the progression of myopia in subjects.

The following list is therefore provided as an example and is not exhaustive or limitative.

Said myopia control solution may comprise a device for implementing one of the following actions or several of the following actions simultaneously. Each of the following actions and the device or product to implement it corresponds to a basic myopia control solution:
a) correcting or reducing the accommodative lag during near vision activities;
b) correcting peripheral hyperopic defocus or providing myopic defocus;
c) providing retinal stimulation with light using multiple light stimuli located in front of retina of the eye of the subject;
d) providing a different contrast in peripheral vision of the subject by using a lens having a lower transmission in the region corresponding to peripheral vision;
e) limiting the amount of red light entering the eye to reduce chromatism of the eye;
f) providing light having a specific wavelength to the eye to inhibit eye lengthening;
g) providing dynamically varying light stimuli such as flickering in order to decrease the contrast on the periphery of the retina by activating/deactivating diffusing elements according to the flickering frequency;
h) providing drugs to regulate retinal and scleral muscarinic receptors of the eye;
j) reshaping the cornea of the eye to reduce refraction defects;
k) providing myopic defocus in the retinal periphery and/or optical aberrations by flattening the shape of the cornea.

The accommodative lag of the eye is defined as the difference between accommodative demand and accommodative response and resulting in a residual refractive error.

Each myopia control solution may comprise one or several basic myopia control solution as described above. In practice, these actions are performed with five types of devices for controlling myopia:
Ophthalmic lenses integrated to spectacles,
Contact lenses worn directly on the eye of the subject,
Light sources, for example to reproduce daily light indoors or avoid emitting wavelengths responsible for eye elongation,
Filters such as blue-cut filters cutting wavelengths responsible for eye elongation, for example integrated to a lens or comprising digital screen filters,
Pharmaceutical products.

Each device for controlling myopia may perform one or several actions listed above. Each myopia control solution may use one or several devices for controlling myopia.

For example, correcting or reducing the accommodative lag during near vision activities is done using a lens having a positive sphere power in the region of the lens used in near vision tasks. It may be a bifocal lens comprising a zone with a positive sphere located in the near vision region of the lens or a progressive lens with addition in the near vision region. An example of bifocal lenses used to control myopia may be a prismatic bifocal lens having two optical zones: the zone located in the far vision region (upper part of the lens) compensate the myopic refraction defect of the eye, whereas the zone located in the near vision region (lower part of the lens) reduces the accommodation demand to see at near end and therefore the accommodative lag.

Correcting peripheral hyperopic defocus or providing myopic defocus may be achieved by using a lens having a positive sphere power in the periphery of the lens.

Customized lenses providing retinal stimulation using multiple light stimuli located in front of retina of the eye of the subject may be used, which comprises:
a refraction area having a first refractive power based on a prescription for correcting an abnormal refraction of said eye; and
a plurality of at least three optical elements, at least one optical element having an optical function of not focusing an image on the retina of the eye so as to slow down the progression of the abnormal refraction of the eye;

Such lenses are described for instance in document WO2019166654.

Providing a different contrast in peripheral vision may be achieved by inserting scattering elements in periphery of the lens.

Limiting the amount of red light entering the eye may be achieved using a specific filter, for example integrated to a lens.

Limiting the amount of red light entering the eye may be achieved using a specific filter, for example integrated to a lens.

Providing light having a specific wavelength to the eye to inhibit eye lengthening may be achieved by luminotherapy involving exposing eyes to the wavelength that triggers the dopamine receptors regulating eye elongation.

Providing dynamically varying light stimuli may be achieved by exposing eyes to sinusoidal modulation of white light (with blue or with yellow) according to a temporal frequency.

Providing drugs to regulate retinal and scleral muscarinic receptors may be achieved for example by providing topical atropine directly delivered in the eye of the subject using eye drops. Other pharmacological approaches trialed for myopia control include topical timolol, a nonselective beta-adrenergic antagonist, and oral 7-methylxanthine (7-MX), an adenosine antagonist. The effect of atropine for myopia control has been shown is several studies, such as the study of Wu, P.-C., Chuang, M.-N., Choi, J., Chen, H., Wu, G., Ohno-Matsui, K., Jonas, J. B., Cheung, C. M. G., 2019, «*Update in myopia and treatment strategy of atropine use in myopia control*» in *Eye* 33, 3-13.

The effect of the drugs that may be provided to the eye typically lasts for at least a few hours. This is why when implemented with another myopia control solution the use of the drugs is considered simultaneous.

Corneal reshaping, also known as orthokeratology, is performed by fitting a specially designed gas permeable contact lens on the eye of the subject. The contact lens is typically flattened and reshapes the cornea of the eye to reduce the myopic refraction defect.

Providing myopic defocus in the retinal periphery and/or optical aberrations by flattening the shape of the cornea may be achieved for example by using an ortho-K solution.

Any other myopia control solution known for the man skilled in the art may be taken into account, and therefore included in said database 101 in said memory 100. All possible combinations of basic myopia control solutions may be taken into account, and therefore included in said database 101 in said memory 100. Usually combinations of two basic myopia control solutions are considered, such as the combination of the use of pharmaceutical products such as atropine in combination with any other myopia control solution. The combination lenses providing retinal stimulation with the use of a positive sphere zone in the near vision region could also be considered.

Said one or more memories 100 of the system according to the invention also comprise said data 102 relative to the evolution of the efficacy of each myopia control solution with at least one criterion.

The efficacy of said myopia control solution is defined as a magnitude representative of the ability of this myopia control solution to produce a desired or intended result in controlling the myopia of the wearer. The efficacy may for example be quantified as a percentage value, 100% being the highest efficacy and 0% being the lowest efficacy.

Typically, the efficacy of a myopia control solution may be determined during a clinical trial involving a control group of subjects and a test group of subjects.

The subjects of the control group are provided with a standard myopia correction method, whereas the subjects of the test group are provided with the myopia control solution whose efficacy is to be determined.

For example, subjects of the control group are children wearing classical ophthalmic single vision lenses, whereas the subjects of the test group are provided with a myopia control solution, such as lenses providing retinal stimulation using multiple light stimuli located in front of retina of the eye of the subject may be used.

The evolution of the myopia is followed for the subjects of each of the control group and test group by determining at different times during the clinical trial the value of a magnitude representative of the myopia degree of the eyes of each subject of the control group and test group. The axial length of the eye or the axial elongation (difference between current value of the axial length and a reference value) are examples of such magnitude representative of the myopia degree of the eyes. The spherical equivalent refraction or the absolute value of the spherical equivalent refraction of the eye is another example. Said magnitude representative of the myopia degree of the eyes may also, for example, be determined based on the power of the ideal dioptric correction needed by the eye, measured in diopters.

The axial length of the eye (AL) is the distance between the anterior surface of the cornea and the fovea. It is usually measured by A-scan ultrasonography or optical coherence biometry.

The spherical equivalent is calculated by adding the sum of the sphere power with half of the cylinder power. For example, with a spectacle correction of $-3.00-1.00 \times 180$, the spherical equivalent $= -3.00\ D + \frac{1}{2}\ (-1.00\ D) = -3.00\ D - 0.50\ D = -3.50\ D$ spherical equivalent.

A mean current value of said magnitude representative of the myopia degree of the subjects may then be determined for each group, at each time t.

The efficacy of the myopia control solution tested at time t may then be determined based on the difference between the mean current values at time t of said magnitude representative of the myopia degree of the eye for the control and test groups. The efficacy may be equal to the absolute value of this difference or to the ratio between this difference and the mean current value of the magnitude representative of the myopia degree of the subjects of the control group.

According to the invention, said criterion comprises at least one of the following: time spent using the initial myopia control solution and activity of the subject.

The efficacy of each myopia control solution for a given value of said criterion may be for example estimated based on a predetermined relationship between the efficacy and said criterion.

This relationship might be a theoretical or empirical or measured relationship and is based on the previous clinical trial result. Said relationship then provides the evolution of the efficacy of each myopia control solution with said at least one criterion. Such a relationship is for example described in document WO2020/120595.

In a general manner, said relationship may be based on a correlation between said criterion and said efficacy. It may be obtained by a statistical treatment of data comprising the efficacy determined and the corresponding value of the criterion. In particular, said relationship comprises a mathematical function linking said criterion and said efficacy. This way, it is not necessary to actually determine the actual values of the eye state parameter used to determine the efficacy of the myopia control solution, but determining the value of the criterion is sufficient to determine the efficacy of the myopia control solution.

In a first embodiment of the invention described in more details hereafter, said criterion is the time spent by the subject while using the initial myopia control solution. In this case, the evolution of the efficacy with said criterion corresponds to evolution of the efficacy with time, which is recorded in said memory 100.

It may be obtained, as described before, thanks to a predetermined relationship linking the efficacy of each myopia control solution with the time spent using it, or through measurements allowing determining the efficacy after different time spent using it.

In a second embodiment of the invention described in more details hereafter, said criterion comprises the activity of the subject. In this case, said memory 100 comprises a table with the values of the efficacy of each myopia control solution for each activity of a list of possible activities. These values are preferably predetermined statistically. For example, it is the mean value of the efficacies determined through measurements for different subjects.

In addition to the database 101 and data 102 described previously, said one or more memories may comprise a database 103 where at least one individual feature of the subject is recorded. This database may also comprise data relative to the environment of the subject.

In practice, the system according to the invention said system comprises one or more devices 400 for monitoring the subject and/or the environment of the subject and/or the activities of the subject and/or one or more inputting devices 500 for inputting data relative to the subject and/or his environment and/or his activities.

The system may therefore comprise sensors for monitoring the environment/activities of the subject, such as time of day or night, intensity/spectrum of the ambient light, near-vision or far-vision tasks . . . . It may also comprise an inputting device for the subject to input information on himself and/or his environment and/or activities, for example through a questionnaire (FIG. 1), implemented for example in an application run by a smartphone.

Data gathered by the monitoring devices 400 or inputting devices 500 are recorded in said one or more memories 100 and provided to the one or more processors 200.

In the case of the second embodiment described above, the system according to the invention may in particular comprise one or more devices for monitoring the activity of the subject among the following: a clock, a viewing distance sensor, a lighting conditions sensor, a movement sensor, a digital planning of the activities of the subject, a questionnaire filled out by the subject.

In this case, said data 102 relative to the evolution of the efficacy of each myopia control solution with at least one criterion may be determined taking into account said individual feature of the subject.

Moreover, in the case where said data 102 relative to the evolution of the efficacy of each myopia control solution with at least one criterion is determined taking into account said individual feature of the subject, said individual feature of the subject may be updated at predetermined moments. Said data relative to the evolution of the efficacy of each myopia control solution with at least one criterion is then updated taking into account said updated individual features of the subject and said appropriate moment for modifying or changing said initial myopia control solution is determined based on said updated data.

Said individual feature of the subject may comprise one or more of the following:
- personal historical or physical features of the subject, such as number of myopic parent, age, gender, ethnicity, past or current optical equipment, pathologies, change in rate of myopia progression, change of the biological pattern of the eye, change in the On/Off receptive fields on the retina—optometric features of the subject, such as spherical or cylindrical refraction of the eye, prism, phoria, amplitude of accommodation, near point of convergence, dominant eye, peripheral refraction;
- biometric features of the subject, such as eye axial length, size of the subject, interpupillary distance, cornea thickness;
- general, and in particular ocular, health features of the subject, such as dry eyes;
- features relative to a visual behavior of the subject, such as time spent achieving near vision tasks or far vision tasks, activities practiced, usual time of day when using optical equipment, light environment, sleeping time;
- postural features of the subject, such as viewing distance, head or eye declination when performing some specific tasks such as reading, watching TV, working on a laptop.

These individual features of the subject may also be taken into account in other steps of the method according to the invention as described hereafter.

Figure 2:
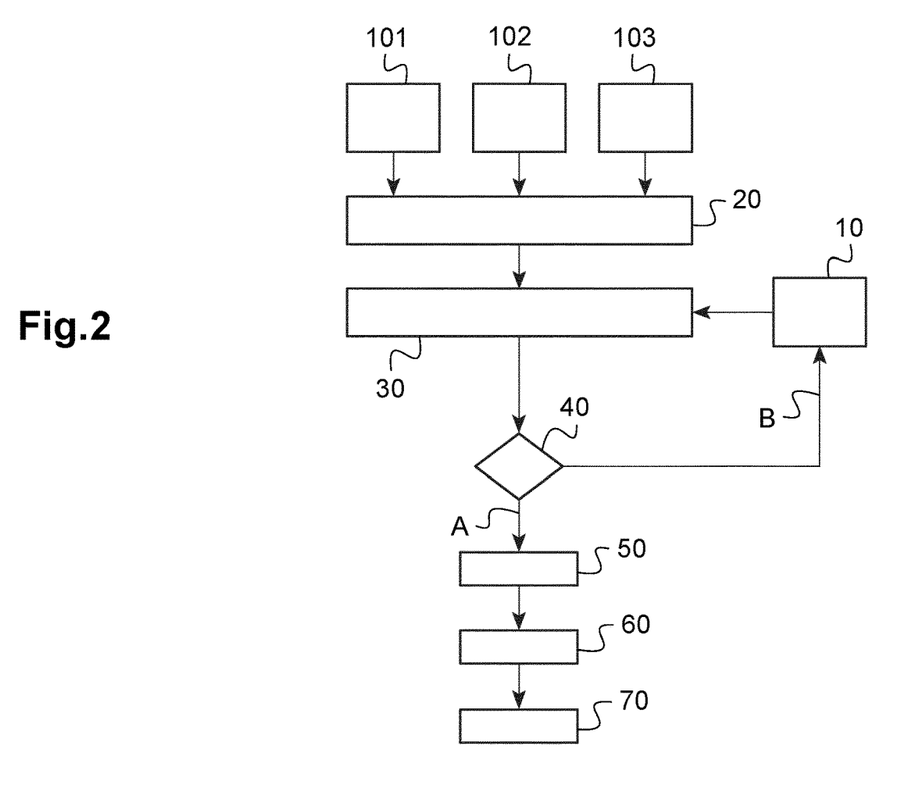
FIG. 2 is a schematic representation of the different steps of the method implemented by the system according to the invention.

Said one or more processors 200 of said system according to the invention are programmed to:
i) determine the value of said criterion at an ulterior time (block 10 of FIG. 2),
ii) determine, based on this value of said criterion at an ulterior time, the efficacy of this initial myopia control solution and the efficacy of other myopia control solutions of said database at this ulterior time (block 30 of FIG. 2),
iii) compare the efficacy of said initial myopia control solution and the efficacy of other myopia control solutions of said database determined for said ulterior time (block 40 of FIG. 2), and
iv) when the efficacy of said initial myopia control solution is lower than the efficacy of at least one of said other myopia control solutions at said ulterior time (arrow A of FIG. 2), determining said appropriate moment for modifying or changing said initial myopia control solution depending on said ulterior time (block 50 of FIG. 2).

When the efficacy of said initial myopia control solution is higher than the efficacy of all other myopia control solution at said ulterior time (arrow B of FIG. 2), steps i) to iii) are repeated.

Said one or more processors may also be programmed to determine the initial myopia control solution before performing the above mentioned steps i) to iv). This determination or choice of the initial myopia control solution may be achieved through any method known from the man skilled in the art and will not be described in detail hereafter.

In a general manner, said one or more processors 200 are programmed to determine the efficacy of each available myopia control solution, compare them and choose the one with the highest efficacy as the initial myopia control solution for said subject. Preferably, when said one or more memories 100 comprise a database where at least one individual feature of the subject is recorded, said one or more processors 200 are programmed to determine said initial myopia control solution using a predetermined relationship model configured for providing the efficacy of each myopia control solution taking into account the individual feature of the subject, comparing the efficacies determined and determining the initial myopia control solution as the one with the highest efficacy determined.

Further, said one or more processors 200 may be programmed to:
- determine a group of myopia control solutions adapted to the subject taking into account said individual features of the subject,
- using a predetermined relationship model configured for providing the efficacy of each myopia control solution of said group of myopia control solutions taking into account the individual feature of the subject, and
- comparing the efficacies of each myopia control solution of said group of myopia control solutions and
- determining said initial myopia control solution based on this comparison.

Such a predetermined relationship model is for example described in WO2020/120595.

In a general manner, the predetermined relationship model may be updated regularly based on live/regular updates of new clinical trials and subjects test results, so as to dynamically adjust the expected efficacy of each myopia control solution based on these data.

The initial myopia control solution is then determined as the one with the highest efficacy among all the myopia control solutions of said group of myopia control solutions for said subject.

Moreover, when said one or more memories comprise said database 103 where at least one individual feature of the subject is recorded, said one or more processors may be additionally programmed to preselect (bloc 20 of FIG. 2), among said database 101 of available myopia control solutions a group of myopia control solution adapted to said subject based on said individual features, the efficacy of which is determined and compared to the efficacy of the initial myopia control solution.

The step of preselection is performed before step ii), so that the efficacy or a reduced number of myopia control solutions is determined in step ii). The processors may therefore perform step ii) more quickly. The processors 200 may for example be programmed to compare said individual features to threshold values of the individual features and select the preselected myopia control solution based on this comparison.

For example, the individual features of a child may indicate that he has a particularly thin cornea, that is to say, that the thickness of the cornea of this child is below a predetermined thickness threshold. Said one or more processors are then programmed to remove the myopia control solutions using a soft contact lens from the list of available myopia control solutions for said child. All other myopia control solutions are preselected.

As another example, for a child having a strong exophoria at near, that is to say, an exophoria above a predetermined exophoria threshold, said one or more processors are programmed to remove the bifocals and progressive addition lenses from the list of available myopia control solution for this child. All other myopia control solutions are preselected.

The system according to the invention may additionally comprise a device 300 for emitting a signal indicating to the subject the appropriate moment for modifying or changing an initial myopia control solution as determined. The signal may be of any type: sonor, visual, haptic signals, notifications on parents' phone. The signal may also indicate how to modify or change the initial myopia control solution. In this case, the corresponding method according to the invention comprises a step of emitting a signal indicating to the subject the appropriate moment for modifying or changing an initial myopia control solution as determined (block 60 of FIG. 2).

The system according to the invention may indeed additionally determine how to modify or change the initial myopia control solution, that is to say, how to modify the implementation parameters of said initial myopia control solution to adapt its effect on the subject, or change the initial myopia control solution for another, different myopia control solution.

The system according to the invention is then additionally programmed to determine the modified or changed myopia control solution.

Basically, as the efficacy of said initial myopia control solution and the efficacy of other myopia control solutions of said database have been determined for said ulterior time, the system may be programmed to determine the changed myopia control solution as being the myopia control solution with the highest efficacy at said ulterior time.

Said modification of the initial myopia control solution implies no change in the nature of the myopia control solution already implemented, but rather a modification of the implementation parameters of the initial myopia control solution. This modification aims at increasing the effect of the initial myopia control solution or its efficacy. It may also aim at increasing compliance of the subject to the myopia control solution.

For example, the expected value of the eye state parameter may have not been reached because of a lack of compliance to the recommended usage of the initial myopia control solution provided by the practitioner or the solution manufacturer. In the case of spectacle lenses, it can be that eyeglasses are not worn long enough during the day or not every day. One parameter to be modified can be the frame in order to have a more stable or comfortable one.

Other possible modifications may include, depending on the myopia control solution being modified:
increased addition power or more positive sphere power for solutions relating to correcting or reducing accommodative lag during near vision activities;
increased positive sphere power for solutions correcting peripheral hyperopic defocus in the region corresponding to peripheral vision;
increased number of lenslets and/or the positive range of power of the lenslets for solutions providing retinal stimulation using multiple light stimuli located in front of retina of the eye of the subject;
lowered transmittance in the periphery of the lenses to increase contrast for solutions providing a different and lower contrast in peripheral vision of the subject;
decreased amount of red light for solutions limiting the amount of red light entering the eye to reduce chromatism of the eye using a specific filter;
increased transmission of the wavelength for solutions providing light having a specific wavelength to the eye to inhibit eye lengthening;
increased frequency for solutions providing dynamically varying light stimuli such as flickering;
increased dosage for solutions providing drugs to regulate retinal and scleral muscarinic receptors;
modification of the shape of the lenses used in orthokeratology solutions to provide a flatter base curve, or at least a flatter center zone.

The method according to the invention then comprises determining the modified or changed myopia control solution. Finally, the method may comprise a final step of implementing the modified or changed myopia control solution (block 70 of FIG. 2).

In said first embodiment, the criterion is the time spent by the subject using the initial myopia control solution.

Said data 102 relative to the evolution of the efficacy of each myopia control solution of the database 101 comprise for example tables or graphical representations of the evolution with time of use of the efficacy of each myopia control solution available.

Figure 3:
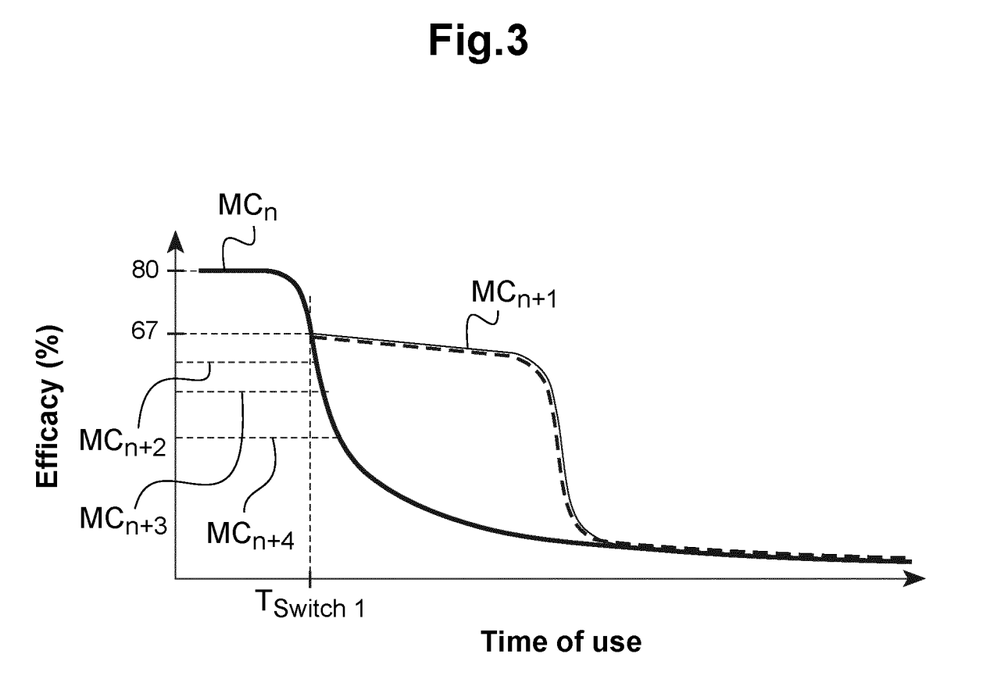
FIG. 3 is a schematic graphical representation of the comparison between the evolutions with time of the efficacies of two different myopia control solutions.

An example of a graphical representation of such an evolution with time of use is shown in FIG. 3 for two different myopia control solutions. The curve $MC_n$ corresponds to the efficacy with time of use of the initial myopia control solution. The curve $MC_{n+1}$ corresponds to the efficacy with time of use of another myopia control solution.

In an example of this first embodiment, the system comprises an inputting device, for example an application of a smartphone, used in a first step to input at least one individual feature of the subject, as described above.

The one or more processors are programmed to preselect a group of myopia control solutions among the myopia control solutions available listed in database 101, said group being adapted to the subject based on said individual feature.

As already described, in an optional preliminary step, the one or more processors may be programmed to determine the initial myopia control solution proposed to said subject.

The system according to the invention may then determine the value of said time of use at an ulterior time and determine, based on this value of said time of use at an ulterior time, the efficacy of this initial myopia control solution and the efficacy of other myopia control solutions of said database at this ulterior time.

These two steps i) and ii) are here simultaneously achieved by the determination of the evolution with time of use of the efficacy of the initial myopia control solution and the determination of the initial efficacy of each of the other myopia control solutions, that is to say at a time of use equal to zero. The efficacy of all other myopia control solution will indeed be, for any ulterior time, equal to the efficacy at a time of use equal to zero as they were not implemented yet.

Step iii) of comparing the efficacy of said initial myopia control solution and the efficacy of other myopia control solutions of said database determined for said ulterior time may be achieved for any ulterior time by comparing the evolution with time of use of the efficacy of the initial myopia control solution and the initial efficacy of each of the other myopia control solutions. This may be advantageously done by comparing graphical representations of efficacies of the initial myopia control solution $MC_n$ and the values of the initial efficacy of the other myopia control solutions $MC_{n+1}$, $MC_{n+2}$, $MC_{n+3}$, $MC_{n+4}$ (FIG. 3). The appropriate time (Tswitch1) for modifying or changing the initial myopia control solution is determined to be when the efficacy of the initial myopia control solution reaches the value of the initial efficacy of the other myopia control solution having the highest initial efficacy among the myopia control solution available.

The myopia control solution to be implemented after the appropriate time Tswitch1 determined may be determined to be the myopia control solution $MC_{n+1}$ having the next highest efficacy or it can be determined by another method or device, as mentioned hereafter.

In a simplified embodiment, the efficacies of all available myopia control solutions are computed only once and successive appropriate times for modifying or changing the current myopia control solution may be determined from the beginning as corresponding to each time of use of each successive solution when the current myopia control solution efficacy drops below the maximum efficacy of another myopia control solution. In this case, said at least one individual feature of the subject initially inputted is used to determine each successive appropriate time.

In a different embodiment, the individual feature of the subject is updated before determining each next appropriate time for modifying or changing the current myopia control solution. The efficacies of the available myopia control solution are determined taking into account the updated individual feature. In the second embodiment, said criterion comprises at least an activity of the subject.

Said data 102 relative to the evolution of the efficacy of each myopia control solution of the database 101 comprise for example tables giving the values of the efficacy of each myopia control solution available for each activity of a list of activities recorded in said system.

For example, for a near-vision activity such as reading, the memories of the system comprise data indicating an efficacy of a first basic myopia control solution of 45%. A second myopia control solution combining the first basic solution with a second basic myopia control solution has an efficacy of 36% and a third myopia control solution combining the second basic myopia control solution and a third basic myopia control solution has an efficacy of 68%.

On the contrary, for an activity involving a movement of the subject, such as commuting, the second myopia control solution has an efficacy of 22%, whereas a fourth basic myopia control solution has an efficacy of 75%.

Of course, more than two basic myopia control solutions may be considered, and the corresponding tables may be multidimensional.

In an example of this second embodiment, the system comprises an inputting device, for example an application of a smartphone, used in a step to input at least one individual feature of the subject, as described above.

The one or more processors may then be programmed to preselect a group of myopia control solutions among the myopia control solutions available listed in database 101, said group being adapted to the subject based on said individual feature.

In an optional preliminary step, the system according to the invention may be programmed to determine the initial myopia control solution on the basis of the initial activity of the subject, on the basis of his most frequent activity and/or by taking into account the individual features of the subject.

The initial myopia control solution may in particular be the one with the highest efficacy for said initial or most frequent activity, taking into account the individual features of the subject. It may alternatively be determined based on any known method.

In an example of this first embodiment, the system comprises an inputting device, for example an application of a smartphone, used to input at least one individual feature of the subject as described before.

The one or more processors are programmed to preselect a group of myopia control solutions among the myopia control solutions available listed in database 101, said group being adapted to the subject based on said individual feature.

In this second embodiment, the system comprises devices for monitoring the activities of the subject. Each time a change of activity is detected by the system, said one or more processors are programmed to compare the efficacy of all available myopia control solutions or of the solution of said preselected group of myopia control solutions. If a myopia control solution different from said initial or current myopia control solution presents a higher efficacy than the efficacy of the initial or current myopia control solution, then the time when the change of activity is detected is determined to be the appropriate time to modify or change the initial or current myopia control solution.

In particular, said device for monitoring the activities of the subject may comprise an electronic agenda of the subject and an inputting device for said subject to input his activities. The time of change of activities may therefore be determined directly based on the information of the electronic agenda.

Said device for monitoring the activities of the subject may comprise sensors for movement detection and an artificial intelligence algorithm able to recognize movement patterns and associate them with an activity.

Additionally, the one or more processors may be programmed to determine the next myopia control solution to propose to the subject.

In the case of the second embodiment, they may be basically programmed to propose the myopia control solution having the best efficacy for the current or planned activity of the subject.

Alternatively, said one or more processors may be programmed to take into account the features of the activity of the subject regarding visual tasks, environment, safety and protection of the eyes of the subject to determine a modification of the current myopia control solution or a change to another myopia control solution.

For example, for near vision activity, eyes are accommodating and accommodative lag may occur. Therefore any solution aiming to correct or reduce accommodative lag seems more appropriate to such near vision activities.

On the contrary, for far vision during which there is no accommodation, such multifocal spectacle solutions are not appropriate. It will be preferred to provide peripheral hyperopic defocus or retinal stimulation using multiple light stimuli located in front of the retina of the eye of the subject.

In a variant, the steps of determining the efficacy of each myopia control solution in view of each activity of the subject and comparing the efficacy of all the available myopia control solutions is done in a preliminary step so that the myopia control solution with highest efficacy is directly associated with each activity. When the system detects a change of activity, it may directly compare the myopia control solutions associated with the initial activity and next activity and check if a modification or change of the myopia control solution is needed.

As a specific example, an initial myopia control solution implemented by a subject may be "adding myopic defocus signal on top of a clear image". This solution corresponds to the action c) of providing retinal stimulation using multiple light stimuli located in front of the retina of the eye of the subject, as listed before.

In the case of this specific example, said initial myopia control solution is implemented in a pair of active spectacles that the subject wears most of the time. The subject is typically a child.

The system is integrated into a portable device, such as a smartphone, tablet or smart watch controlling active spectacles. It comprises at least one device 400 for monitoring the subject, the environment of the subject and the activities of the subject and an inputting device for inputting data relative to the subject and/or his environment and/or his activities. The system may comprise a plurality of monitoring devices. They may be integrated to the active spectacles or to said portable device.

The monitoring devices are measuring in particular the time of the day, movement of the subject, light intensity, viewing distance.

The system works continuously every day.

At the beginning of each day, the system detects that the subject is awake. The system automatically sends a message to the subject indicating to use the initial myopia control solution, that is to say, to put his spectacles on. The system also analyses the agenda of the subject and reminds him not to forget to bring his contact lenses to school because he's going to play soccer today. In other words, the system is programmed to determine that, at an ulterior time, a modification or change of the current myopia control solution or a change to another myopia control solution is needed taking into account the features of the activity of the subject regarding visual tasks and safety of the subject. The contact lenses may also have a higher efficiency than the glasses in these conditions.

While the subject is commuting to school, the smart watch detects movement and activates the reducing peripheral defocus option of said active spectacles. This corresponds to the determination of another appropriate time for a modification or a change to a second myopia control solution.

Once in the school, the system removes the reducing the peripheral defocus option from the active spectacles. By measuring viewing distances thanks to sensors included in said active spectacles, the system determines if the current visual task is a near vision task. When a near vision task is detected, the system activates the "reducing the accommodative lag" option of the lenses of said active spectacle therefore modifying again the myopia control solution implemented.

When the time for soccer arrives, the smart watch emits a signal to indicate to the subject that it is the appropriate time to temporarily change the myopia control solution from spectacle to contact lenses.

At the end of soccer practice, the smart watch emits a signal to indicate to the subject that it is the appropriate time to change back the myopia control solution from contact lenses to spectacle.

After school while commuting back home, the smart watch detects movement and activates the reducing peripheral defocus option of the lenses of the active spectacles.

At home, the system removes the reducing the peripheral defocus option from the active spectacles. By measuring viewing distances thanks to sensors included in said active spectacles, the system determines if the current visual task is a near vision task. When a near vision task is detected, the system activates the "reducing the accommodative lag" option of the lenses of said active spectacles therefore modifying again the myopia control solution implemented.

Before sleeping, the smart watch emits a signal indicating that the time is appropriate for changing the myopia control solution by removing the spectacles and putting atropine drops in his eyes.

As already mentioned, in addition to taking into account the efficacies of the available myopia control solution to determine the appropriate time for modifying or changing the myopia control solution, the system according to the invention may take into account features of the current or future activity of the subject. The system may comprise a device for measuring ambient light intensity, and activate a solar filter when needed, above 1000 lux for example or emit a signal indicating that additional lighting is needed, below 10 lux for example. Upon detection of a dynamic activity, the system may determine that contact lenses of protective goggles are needed.

In a general manner:
when peripheral vision is required, for example while moving at a speed over 5 kilometers per hour, "reducing peripheral defocus" option is activated,
when near work activity (reading, gaming, smartphone) with a viewing distance below 30 cm is detected, "reducing accommodative lag" option is activated,
during dynamic activities, for safety issues, contact lenses are recommended.

In a variant, that may be applied to both embodiments described and does not use graphical representations of the relationship between efficacies and criterion, the expected efficacies at a plurality of ulterior times are determined thanks to the relationship and said appropriate moment for modifying or changing said initial myopia control solution is determined as the time where the expected efficacy of said initial myopia control solution becomes equal or inferior to the expected efficacy of another myopia control solution.

The invention claimed is:

1. A system for determining an appropriate moment for modifying or changing an initial myopia control solution used by a myopic subject at an initial time, comprising:
one or more memories and one or more processors, said one or more memories having a database of available myopia control solutions and data relative to an evolution of efficacy of each myopia control solution with at least one criterion, said one or more processors being programmed to:
determine a value of said criterion at an ulterior time,
compute, based on this value of said criterion at the ulterior time, the efficacy of this initial myopia control solution and the efficacy of other myopia control solutions of said database at this ulterior time,
compare the efficacy of said initial myopia control solution and the efficacy of other myopia control solutions of said database determined for said ulterior time, and
when the efficacy of said initial myopia control solution is lower than the efficacy of at least one of said other myopia control solutions at said ulterior time, determine a modified initial myopia control solution or a changed myopia control solution for said subject and determine, depending on said ulterior time, said appropriate moment for modifying or changing said initial myopia control solution to said modified initial myopia control solution or to said changed myopia control solution for said subject.

2. The system according to claim 1, wherein said criterion comprises at least one of the following: time spent using the initial myopia control solution and activity of the subject.

3. The system according to claim 2, wherein said efficacy is estimated based on a predetermined relationship between the efficacy and said criterion.

4. The system according to claim 2, wherein said myopia control solution comprises at least a device for implementing one of the following actions or several of the following actions simultaneously:
- correcting or reducing an accommodative lag during near vision activities;
- correcting peripheral hyperopic defocus or providing myopic defocus;
- providing retinal stimulation;
- providing a different contrast in peripheral vision of the subject;
- limiting an amount of red light entering an eye to reduce chromatism of the eye;
- providing light having a specific wavelength to the eye to inhibit eye lengthening;
- providing dynamically varying light stimuli such as flickering;
- providing drugs to regulate retinal and scleral muscarinic receptors;
- reshaping a cornea of the eye to reduce refraction defects; and
- providing myopic defocus in retinal periphery and/or optical aberrations by flattening a shape of the cornea.

5. The system according to claim 2, wherein said system comprises one or more devices for monitoring the subject and/or an environment of the subject and/or the activities of subject and/or one or more inputting devices for inputting data relative to subject and/or his environment and/or his activities.

6. The system according to claim 1, wherein said efficacy is estimated based on a predetermined relationship between the efficacy and said criterion.

7. The system according to claim 6, wherein said myopia control solution comprises at least a device for implementing one of the following actions or several of the following actions simultaneously:
- correcting or reducing an accommodative lag during near vision activities;
- correcting peripheral hyperopic defocus or providing myopic defocus;
- providing retinal stimulation;
- providing a different contrast in peripheral vision of the subject;
- limiting an amount of red light entering an eye to reduce chromatism of the eye;
- providing light having a specific wavelength to the eye to inhibit eye lengthening;
- providing dynamically varying light stimuli such as flickering;
- providing drugs to regulate retinal and scleral muscarinic receptors;
- reshaping a cornea of the eye to reduce refraction defects; and
- providing myopic defocus in retinal periphery and/or optical aberrations by flattening a shape of the cornea.

8. The system according to claim 6, wherein said system comprises one or more devices for monitoring the subject and/or an environment of subject and/or activities of subject and/or one or more inputting devices for inputting data relative to subject and/or his environment and/or his activities.

9. The system according to claim 1, wherein said myopia control solution comprises at least a device for implementing one of the following actions or several of the following actions simultaneously:
- correcting or reducing an accommodative lag during near vision activities;
- correcting peripheral hyperopic defocus or providing myopic defocus;
- providing retinal stimulation;
- providing a different contrast in peripheral vision of the subject;
- limiting an amount of red light entering an eye to reduce chromatism of the eye;
- providing light having a specific wavelength to the eye to inhibit eye lengthening;
- providing dynamically varying light stimuli such as flickering;
- providing drugs to regulate retinal and scleral muscarinic receptors;
- reshaping a cornea of the eye to reduce refraction defects; and
- providing myopic defocus in retinal periphery and/or optical aberrations by flattening a shape of the cornea.

10. The system according to claim 9, wherein said system comprises one or more devices for monitoring the subject and/or an environment of the subject and/or the activities of subject and/or one or more inputting devices for inputting data relative to subject and/or his environment and/or his activities.

11. The system according to claim 1, wherein said system comprises one or more devices for monitoring the subject and/or an environment of subject and/or activities of subject and/or one or more inputting devices for inputting data relative to subject and/or his environment and/or his activities.

12. The system according to claim 1, wherein said one or more memories comprise a database where at least one individual feature of the subject is recorded, and
wherein said data relative to the evolution of the efficacy of each myopia control solution with at least one criterion is determined taking into account said individual feature of the subject.

13. The system according to claim 12, wherein said individual feature of the subject is updated at predetermined moments, said data relative to the evolution of the efficacy of each myopia control solution with at least one criterion is updated taking into account said updated individual features of the subject and said appropriate moment for modifying or changing said initial myopia control solution is determined based on updated data.

14. The system according to claim 1, wherein said one or more memories comprise a database where at least one individual feature of the subject is recorded and said one or more processors are programmed to preselect, among said database of available myopia control solutions, a group of myopia control solutions adapted to said subject based on said individual features, the efficacy of which is determined and compared to the efficacy of the initial myopia control solution.

15. The system according to claim 14, wherein said individual feature of the subject comprises one or more of the following:
- personal historical or physical features of the subject;
- optometric features of the subject;
- biometric features of the subject;

general health features of the subject;
features relative to a visual behavior of the subject; and
postural features of the subject.

16. The system according to claim 1, wherein said one or more memories comprise a database where at least one individual feature of the subject is recorded and said one or more processors are programmed to determine said initial myopia control solution, said determination comprising:
using a predetermined relationship model configured for providing the efficacy of each myopia control solution taking into account the individual feature of the subject, comparing the efficacies determined, and
determining said initial myopia control solution based on this comparison.

17. The system according to claim 1, wherein said criterion comprises at least an activity of the subject, and said one or more processors are programmed to determine a modification of current myopia control solution or a change for another myopia control solution taking into account features of the activity of the subject regarding visual tasks, environment, safety and protection of eyes of the subject.

18. The system according to claim 1, wherein said one or more processors are additionally programmed to determine a modified initial myopia control solution or a changed myopia control solution for said subject.

19. The system according to claim 1, further comprising a device for emitting a signal indicating to the subject the appropriate moment for modifying or changing an initial myopia control solution as determined.

20. A method for determining an appropriate moment for modifying or changing an initial myopia control solution used by a myopic subject at an initial time, comprising:
accessing a database of available myopia control solutions and data relative to an evolution of efficacy of each myopia control solution with at least one criterion;
determining a value of said criterion at an ulterior time;
computing, based on this value of said criterion at the ulterior time, the efficacy of this initial myopia control solution and the efficacy of other myopia control solutions of said database at this ulterior time;
comparing the efficacy of said initial myopia control solution and the efficacy of other myopia control solutions of said database determined for said ulterior time; and
when the efficacy of said initial myopia control solution is lower than the efficacy of an alternative solution at said ulterior time, determining a modified initial myopia control solution or a changed myopia control solution for said subject and determining, depending on said ulterior time, said appropriate moment for modifying or changing said initial myopia control solution to said modified initial myopia control solution or to said changed myopia control solution for said subject.

* * * * *